(12) United States Patent
Brandt et al.

(10) Patent No.: US 12,006,396 B2
(45) Date of Patent: Jun. 11, 2024

(54) AMORPHOUS POLYESTERS ON THE BASIS OF BETULIN

(71) Applicant: HENKEL AG & CO. KGAA, Duesseldorf (DE)

(72) Inventors: Adrian Brandt, Essen (DE); Horst Beck, Neuss (DE); Kerstin Schroeder, Grevenbroich/Wevelinghoven (DE); Alexander Kux, Monheim (DE)

(73) Assignee: HENKEL AG & CO. KGaA, Duesseldorf (DE)

( * ) Notice: Subject to any disclaimer, the term of this patent is extended or adjusted under 35 U.S.C. 154(b) by 866 days.

(21) Appl. No.: 16/906,613

(22) Filed: Jun. 19, 2020

(65) Prior Publication Data

US 2020/0317859 A1    Oct. 8, 2020

Related U.S. Application Data

(63) Continuation of application No. PCT/EP2018/083091, filed on Nov. 30, 2018.

(30) Foreign Application Priority Data

Dec. 22, 2017    (EP) .................................... 17209984

(51) Int. Cl.
| | |
|---|---|
| *C08L 67/02* | (2006.01) |
| *C08G 63/199* | (2006.01) |
| *C08G 63/553* | (2006.01) |
| *C08G 63/56* | (2006.01) |
| *C08L 63/00* | (2006.01) |
| *C08L 67/06* | (2006.01) |
| *C08L 67/08* | (2006.01) |
| *C08L 75/06* | (2006.01) |
| *C09J 11/08* | (2006.01) |
| *C09J 163/00* | (2006.01) |
| *C09J 175/06* | (2006.01) |
| *C09K 3/10* | (2006.01) |

(52) U.S. Cl.
CPC ......... *C08G 63/553* (2013.01); *C08G 63/199* (2013.01); *C08G 63/56* (2013.01); *C09J 11/08* (2013.01); *C09K 3/10* (2013.01); *C09K 2200/0655* (2013.01)

(58) Field of Classification Search
CPC .......... C08L 67/02; C08L 67/06; C08L 67/08; C08L 63/00; C08L 75/06; C09J 163/00; C09J 175/06
USPC ................................ 528/85, 272, 295.3, 297
See application file for complete search history.

(56) References Cited

U.S. PATENT DOCUMENTS

| | | |
|---|---|---|
| 2008/0004369 A1 | 1/2008 | Seppala |
| 2015/0197668 A1* | 7/2015 | Sacripants ........... C08G 63/553 |
| | | 527/604 |

FOREIGN PATENT DOCUMENTS

| | | | |
|---|---|---|---|
| CN | 101098908 A | | 1/2008 |
| JP | 2001288222 A | * | 10/2001 |
| JP | 2013082929 A1 | | 5/2013 |
| JP | 5385108 B2 | | 1/2014 |
| RU | 2167892 C1 | | 5/2001 |
| WO | 2006/053936 A1 | | 5/2006 |

OTHER PUBLICATIONS

Nemilov, V. E. et al., "Kinetics of Polycondensation of Betulin with Adipic Acid", Russian Journal of Applied Chemistry, vol. 78, No. 7, 2005, pp. 1162-1165.
V. Erä and Jääskelään. Journal of the American Oil Chemists' Society (JAOCS), Jan. 1981, pp. 20-23.
Dissertation: Polymers from the Natural Product Betulin; A Microstructural Investigation, Max-Planck-Institut Für Kolloid- und Grenzflächenforschung, Jul. 3, 2012.

* cited by examiner

*Primary Examiner* — Michael J Feely
(74) *Attorney, Agent, or Firm* — Sun Hee Lehmann

(57) ABSTRACT

The present invention relates to amorphous polyesters on the basis of betulin, a method for producing them and their use.

16 Claims, No Drawings

AMORPHOUS POLYESTERS ON THE BASIS OF BETULIN

BACKGROUND OF THE INVENTION

The present invention relates to amorphous polyesters on the basis of betulin, a method for producing them and their use.

Substituting petrol-based raw materials with those that can be obtained from sustainable sources is gaining in importance in the chemical industry, especially in light of increasing environmental awareness and the scarcity of the raw materials that have heretofore been used. Apart from finding and identifying suitable sources of raw materials, this also includes the difficulty that raw materials from renewable sources usually have different properties from the corresponding petrol-based compounds, which is reflected in the products made from the raw materials, which may have different chemical or physical properties, for example, than products manufactured from petroleum-based starting materials. Accordingly, not only do the extraction and processing chains have to be adapted to the raw materials, but some of the production methods must also be adapted in order to allow for the difference between petroleum-based raw materials and raw materials from renewable resources.

One raw material that can be obtained from renewable sources and demonstrates promising properties for use in the chemical industry is betulin.

Betulin, which is also known as (3β)-lup-20(29)-en-3,28-diol, is among the pentacyclic triterpenes and has a C30 body, the basic structure of which is based on hydrocarbon rings. Owing to the structure of the betulin, which is composed of four six-membered rings and one five-membered ring, it belongs to the triterpene group of lupanes. Pentacyclic triterpenes are very common in the plant kingdom. For instance, the cork and bark of the birch tree contain as much as 40% pentacyclic triterpenes, wherein up to 34% of the dry mass of the white birch cork is composed of betulin. Besides the birch cork, betulin is present in smaller concentrations in the roots and leaves of the white ash, for example, and in the bark of the American mountain ash. In addition to its medical use in the treatment of dermal wounds, the biological significance of betulin is seen in its anti-inflammatory properties, and the hope is that this compound can be used in the treatment of malaria, tumors and HIV. A further advantage of betulin lies in the fact that it accumulates as a by-product of paper production and that another contribution to sustainability can be made in this way.

Heretofore, an industrial use of betulin was hindered by its poor solubility, the result of which was that reactions were possible only under harsh conditions, such as the use of chlorinated compounds or ecologically harmful solvents.

WO 2006/053936 describes a method for producing polymers on the basis of biodegradable or substantially renewable raw materials that can be crosslinked by a free radical reaction, wherein betulin is mentioned as a possible diol component.

V. Erä and Jääskeläinen describe in the *Journal of the American Oil Chemists' Society* (JAOCS) from January 1981 (pages 20 through 23) a synthetic pathway for the production of fatty acid esters of betulin via the acid chloride pathway.

In the *Russian Journal of Applied Chemistry*, Vol. 78, No. 7, 2005, pages 1162-1165, V. E. Nemilov et al. describe a kinetic study for the polycondensation of betulin with adipic acid, wherein in particular the different behavior of the primary and secondary hydroxyl group of the betulin as well as its isopropenyl groups are emphasized.

DETAILED DESCRIPTION OF THE INVENTION

There was therefore a need for simple and uncomplicated ways to use betulin as a substitute for petroleum-based raw materials in industrial applications. A chemical compound class that is of particular interest in this regard is polyesters, which are widely employed in the chemical industry. In particular, the difficulty arises here of producing polyesters from renewable resources that result in products with properties comparable to those of products that were produced from conventional, petroleum-based resources, wherein it has not yet been possible to achieve satisfactory results in particular during the production of amorphous polyesters, which can be used over a wide temperature range.

A problem addressed by the present invention was thus that of providing a polyester on the basis of renewable raw materials that exhibited properties comparable to those of conventional polyesters. Furthermore, a problem addressed by the present invention was that of providing a method that offers easy and efficient access to this type of polyesters that are based on renewable resources and that preferentially omit hazardous reagents, such as chlorinated compounds, or solvents, such as tetrahydrofuran or pyridine.

Surprisingly, it was found that this problem is solved by the polyester according to the invention and the method according to the invention for producing it.

A first subject of the present invention is thus an amorphous polyester on the basis of betulin, which has a glass transition temperature $T_g$ of −50° C. to 80° C. Polyesters with a glass transition temperature in the indicated range can take on a liquid to a solid physical state at room temperature.

In this instance, the glass transition temperature was determined by dynamic difference calorimetry (differential scanning calorimetry, DSC).

It was surprisingly found that the polyester according to the invention can be employed over a wide temperature range. Moreover, it was surprisingly discovered that, with the betulin-based polyester according to the invention, customized components can be produced that can simulate the typical properties of conventional amorphous polyesters that are liquid or solid at room temperature and are thus additionally odorless, substantially free of aromatic components, biodegradable and renewable and, depending upon further processing, provide mechanically flexible polymers.

In one preferred embodiment, the polyester according to the invention has a glass transition temperature $T_g$ of −40° C. to 70° C., determined by DSC.

The polyester according to the invention is distinguished in that it is produced from renewable raw materials. For this reason, the proportion of betulin structural units in the polyester according to the invention is preferentially 6 to 65 mol %, especially preferably 10 to 50 mol %. Surprisingly, it was found that the properties of aromatic polyesters in particular could be simulated in this way, without the polyester having migration-capable impurities that would pose a hindrance to a later application, such as in the field of food technology.

Polyesters with an acid value of less than 50 mg KOH/g per gram of reaction mixture have proven to be ideal with regard to further processing and reaction with other compounds. Thus an embodiment is preferred in which polyesters according to the invention have an acid value of less than 50 mg KOH/g, preferentially less than 10 mg KOH/g and especially preferably less than 5 mg KOH/g, in each case per gram of reaction mixture. In an especially preferred embodiment, the polyester according to the invention has an acid value of 0.1 to 3 mg KOH/g per gram of reaction mixture. It has been surprisingly demonstrated that polyesters with an acid value in the claimed range exhibit good compatibility with other mono- and polyfunctional compounds.

According to the invention, the acid value is a measured variable that is to be determined by experiment and that is a measure for the number of free acid groups in the respectively defined reference quantity. The acid value can be determined by dissolving a weighed out sample of the reference quantity in a solvent mixture and then potentiometrically titrating it in methanol with 0.05 mol/l KOH. The acid value corresponds to the amount of KOH added per gram of the reference quantity at the reversal point of the potentiometric titration curve.

According to the invention, the hydroxyl value (OH value) is considered a measure for the number of free hydroxyl groups in a respectively defined reference quantity. The polyester according to the invention preferentially has an OH value of 10 to 220 mg KOH/g, especially preferably 20 to 150 mg KOH/g, in each case per gram of reaction mixture. It was surprisingly found that the polyester according to the invention exhibits an advantageous viscosity that permits efficient processing of the polyester when the OH value lies in the range indicated. The OH value can likewise be determined by experiment using potentiometric titration or acid-base titration.

In one preferred embodiment, the polyester according to the invention further contains amino groups, wherein they are preferentially primary or secondary amino groups. Preferentially, the amine value of the polyester according to the invention is 1 to 20 mg KOH/g, especially preferably 5 to 10 mg KOH/g. The amine value can be determined by means of titration, as with the OH value, and it is similarly considered a measure for the number of free amino groups in a respectively defined reference quantity.

In an especially preferred embodiment, the sum of the OH value and the amine value is 10 to 220 mg KOH/g, especially preferably 20 to 150 mg KOH/g.

The polyester according to the invention is distinguished in particular by its sustainability. For this reason, an embodiment is preferred in which the betulin is obtained from renewable raw materials. A renewable source from which betulin can be isolated is cork and wood bark, for example.

The polyester according to the invention is preferentially a reaction product of betulin with at least one compound selected from the group consisting of dicarboxylic acid, short-chain polyols, amine, vegetable oil and mixtures thereof.

The dicarboxylic acid is preferentially selected from the group consisting of aliphatic dicarboxylic acids with 4 to 24 carbon atoms, aromatic dicarboxylic acids, dimer acids and mixtures thereof.

Particularly preferred are suitable aliphatic dicarboxylic acids selected from the group consisting of succinic acid, adipic acid, azelaic acid, sebacic acid, dodecanoic acid, tridecanedioic acid and mixtures thereof.

Suitable aromatic dicarboxylic acids are preferentially selected from the group consisting of phthalic acid, isophthalic acid, terephthalic acid, furandicarboxylic acid, anhydrides and methyl esters thereof and mixtures thereof.

In one preferred embodiment, the dimer acid or acids are dimers of fatty acids of the general formula $C_nH_{2n+1}COOH$, where n is a whole number from 4 to 33, preferentially 7 to 17. In addition to dimer acids, their derivatives are preferentially also used, which can be obtained, for example, by hydrating or distilling the corresponding dimer acids. Also preferably, the fatty acid is selected from the group consisting of caprylic acid, capric acid, lauric acid, myristic acid, palmitic acid, stearic acid, the derivatives of these fatty acids and mixtures thereof.

The short-chain polyol is preferentially a diol with 2 to 8, preferably 3 to 6 carbon atoms. Suitable short-chain polyols are preferentially selected from the group consisting of ethylene glycol, 1,2-propanediol, 1,3-propanediol, butanediol, 1,6-hexanediol, neopentyl glycol, diethylene glycol, triethylene glycol, 2-methyl-1,3-propanediol, 1,4-pentanediol, glycerol and mixtures thereof. The polyester polyol according to the invention is distinguished by its high content of renewable raw materials, and therefore the short-chain polyol or, in an especially preferred embodiment, is produced from renewable raw materials.

In one preferred embodiment, the amine is a diamine, preferentially one selected from the group consisting of ethylenediamine, tetramethylenediamine, pentamethylenediamine, hexamethylenediamine, octamethylenediamine and decamethylenediamine piperazine, Jeffamine (polyetheramine) and mixtures thereof.

According to the invention, suitable vegetable oils for reacting with betulin are selected from the group consisting of soybean oil, linseed oil, sunflower oil, rapeseed oil, thistle oil, fish oil, castor oil, tall oil, coconut oil, palm oil, olive oil and mixtures thereof.

The polyester according to the invention preferentially includes a proportion of renewable raw materials of 80 to 100 wt. %, preferentially 90 to 99 wt. %, in each case based on the total weight of the polyester. Therefore, an embodiment is especially preferred in which betulin and/or the compound selected from the group consisting of dicarboxylic acid, short-chain polyol, amine, vegetable oil and mixtures thereof are produced from renewable raw materials.

Another subject of the present invention is a method for producing the polyester according to the invention, comprising the following steps:
    (a) providing a mixture comprising betulin and at least one compound selected from the group consisting of dicarboxylic acid, short-chain polyol, amine, vegetable oil and mixtures thereof;
    (b) heating the mixture from step a) and obtaining the polyester.

It was surprisingly found that the method according to the invention permits the production of polyesters on the basis of betulin without having to use any hazardous reagents, such as chlorinated compounds or solvents.

In one preferred embodiment, the mixture is step b) is heated to a temperature of 200 to 250° C., preferentially 205 to 240° C.

It was surprisingly found that reacting betulin with the compound selected from the group consisting of dicarboxylic acid, short-chain polyol, amine, vegetable oil and mixtures thereof proceeds efficiently when the compound is used as the reaction medium. Thus the proportion of betulin and the compound selected from the group consisting of dicarboxylic acid, short-chain polyol, amine, vegetable oil and mixtures thereof is preferentially selected such that the betulin is present in a dissolved form in the mixture.

In one preferred embodiment, the mixture in step a) of the method according to the invention contains betulin and at least one short-chain polyol. Preferentially, the proportion of betulin in the mixture amounts to 10 to 70 wt. %, preferentially 25 to 65 wt. %, based on the total weight of the mixture. Preferentially, the proportion of betulin in the mixture is 9 to 25 wt. %, preferentially 10 to 20 wt. %, based on the total weight of the mixture. In an especially preferred embodiment, the [0001] mixture further contains at least one dicarboxylic acid, preferentially in an amount of 9 to 60 wt. %, preferentially 25 to 45 wt. %, based on the total weight of the mixture.

In an alternatively preferred embodiment, the mixture in step a) of the method according to the invention contains betulin and at least dicarboxylic acid, preferentially at least one dimer acid. Preferentially, the proportion of betulin in the mixture amounts in this case to 10 to 60 wt. %, preferentially 25 to 55 wt. %, based on the total weight of the mixture. Also preferably, the proportion of dimer acid is 30 to 75 wt. %, preferentially 40 to 60 wt. %, based on the total weight of the mixture. In an especially preferred embodiment, the mixture further contains at least one short-chain polyol, preferentially in an amount of 1 to 8 wt. %, especially preferably 1.5 to 6 wt. %.

In an alternatively preferred embodiment, the mixture in step a) of the method according to the invention contains betulin and at least one vegetable oil. Preferentially, the proportion of betulin in the mixture amounts in this case to 10 to 40 wt. %, preferentially 20 to 35 wt. %, based on the total weight of the mixture. Also preferably, the proportion of vegetable oil is 50 to 80 wt. %, preferentially 45 to 70 wt. %, based on the total weight of the mixture. In an especially preferred embodiment, the mixture further contains at least one dicarboxylic acid, preferentially in an amount of 1 to 40 wt. %, especially preferably 5 to 30 wt. %.

Preferentially, the proportion of amine in the mixture is 5 to 25 wt. %, preferentially 9 to 25 wt. % and especially preferably 10 to 20 wt. %, based on the total weight of the mixture.

In an especially preferred embodiment, the mixture contains short-chain polyols and amines. Preferentially, the amines are diamines, especially preferably those selected from the group consisting of ethylenediamine, tetramethylenediamine, pentamethylenediamine, hexamethylenediamine, octamethylenediamine and decamethylenediamine piperazine, Jeffamine (polyetheramine) and mixtures thereof.

In a preferred embodiment of the method according to the invention, the mixture in step a) further contains a catalyst, preferentially in an amount of 0.01 to 0.05 wt. %, especially preferably 0.02 to 0.04 wt. %, based on the total weight of the mixture.

A further subject of the present invention is a polymeric material that can be obtained by addition with organic compounds of the type containing at least one epoxide and/or isocyanate group on terminal hydroxyl groups of a polyester according to the invention. Preferentially, the organic compound comprises at least two epoxide and/or isocyanate groups, especially preferably at least two isocyanate groups.

An isocyanate group is understood within the meaning of the present invention to include both free and blocked or protected isocyanate groups.

It was surprisingly found that the properties of the polymeric material according to the invention can be individually adjusted depending upon the desired application. In this way, both high mechanical flexibility and high strength with the accompanying brittleness can be achieved. Moreover, it is odorless and both biodegradable and substantially free of sensitizing compounds.

The polymeric material according to the invention is thus well-suited both for applications involving direct and indirect contact with food and skin and as a component of thermoplastic materials. Preferentially, the thermoplastic materials are adhesives and/or sealants.

With regard to the polymeric material according to the invention, a chemical modification by means of toluene-2,4-diisocyanate, hexamethyl diisocyanate, isophorone diisocyanate, 1,4-cyclohexyl diisocyanate and diphenylmethyl diisocyanate is preferred.

A further subject of the present invention is the use of the polyester according to the invention and/or the polymeric material according to the invention as a component of a thermoplastic material or of an adhesive and/or sealant. While the polyester according to the invention can be used both in thermoplastics as a deformation and extrusion aid and as a fusing aid for physically bonding adhesives and/or sealants, the polymeric material according to the invention is applied both in thermoplastics and as a tackifying agent in adhesives, since the polymeric material that is obtained permits a low application temperature and high elasticity and mechanical stability and, depending upon the monomer composition, optionally a higher degree of brittleness as well as a higher application temperature with the mechanical strength of the adhesive compound.

The present invention shall be described in greater detail on the basis of the following examples, wherein said examples should in no way be understood as a restriction of the inventive concept.

EXAMPLES

Generally, the polyesters according to the invention can be produced by mixing the individual components and heating the mixture to 220° C. in the nitrogen stream. Exemplary compositions are summarized in Table 1.

The samples are analyzed by means of GPC (gel permeation chromatography). The chromatography with an IR detector after calibration by means of a polystyrene standard occurred at a column oven temperature of 40° C. and a temperature in the detector of likewise 40° C. The relative and the numerical average and weight average molecular weight values can be calculated from the molecular weight distribution curve, and the polydispersity can be determined from that.

The polyesters thereby produced were measured by differential scanning calorimetry, wherein a sample was first heated to 150° C. in order to then be brought to −90° C. at a cooling rate of 10 Kelvin per minute. After 10 minutes at −90° C., the sample was brought to 150° C. at a heating rate of 10 Kelvin per minute and the DSC diagram was recorded. The glass transition temperature of the sample was determined with the aid of the DSC diagram.

TABLE 1

| Example | Composition | Viscosity Brookfield at 140° C. | Glass transition temperature | Acid value in mg KOH/g sample | OH value in mg KOH/g sample | Mn in g/mol | Polydispersity |
| --- | --- | --- | --- | --- | --- | --- | --- |
| 1 | 131.6 g betulin (25 mol %), 25.5 g butanediol (31.6 mol %, 87.8 g sebacic acid (43.4 mol %) | 4500 mPas | 29° C. | 4.0 | 56 | 2453 | 2.1 |
| 2 | 110.68 g betulin (25 mol %), 24.06 g 1,2-propanediol (31.6 mol %, 90.75 g azelaic acid (43.4 mol %) | 30,000 mPas | 19° C. | 3.2 | 27 | 5326 | 2.3 |
| 3 | 110.68 g betulin (25 mol %), 24.05 g 1,2-propanediol (31.6 mol %, 64.07 g adipic acid (43.4 mol %) | 310,000 mPas | 59° C. | 2.4 | 34 | 3872 | 2.1 |
| 4 | 131.63 g betulin (25 mol %), 25.55 g butanediol (31.6 mol %, 87.8 g sebacic acid (43.4 mol %) | 1550 mPas | 12° C. | 2.6 | 80 | 1933 | 2.1 |
| 5 | 110.68 g betulin (25 mol %), 28.48 g butanediol (31.6 mol %, 89.65 g azelaic acid (43.4 mol %) | 1500 mPas | −1° C. | 3.0 | 61 | 2472 | 2.3 |
| 6 | 110.65 g betulin (25 mol %), 28.51 g butanediol (31.6 mol %, 63.44 g adipic acid (43.4 mol %) | 7500 mPas | 29° C. | 2.8 | 59 | 2207 | 2.1 |
| 7 | 110.68 g betulin (25 mol %), 28.49 g butanediol (31.6 mol %, 51.25 g succinic acid (43.4 mol %) | 185,000 mPas | 63° C. | 1.1 | 58 | 2356 | 2 |
| 8 | 64.78 g betulin (30.5 mol %), 135.16 g castor oil (30.5 mol %) 22.08 g succinic acid (39 mol %) | 160 mPas | −35° C. | 1.8 | 71 | 2508 | 2.3 |

TABLE 1-continued

| Example | Composition | Viscosity Brookfield at 140° C. | Glass transition temperature | Acid value in mg KOH/g sample | OH value in mg KOH/g sample | Mn in g/mol | Polydispersity |
|---|---|---|---|---|---|---|---|
| 9 | 110.67 g betulin (25 mol%), 32.93 g 2,2-dimethyl-1,3-propanediol (31.6 mol %), 63.42 g adipic acid (43.4 mol %) | 25,100 mPas | 42° C. | 1.3 | 53 | 2552 | 2 |
| 10 | 103.18 g betulin (46.6 mol %), 4.51 g butanediol (10 mol %), 125.43 g dimer acid Pripol 1013 (43.4 mol %) | 6800 mPas | 22° C. | 2.0 | 29 | 2368 | 2.5 |

The invention claimed is:

1. An amorphous polyester prepared from a reactive raw material mixture of:
    (a) betulin;
    (b) dicarboxylic acid; and
    (c) at least one compound selected from the group consisting of short-chain polyol, amine, and vegetable oil, characterized in that the amorphous polyester has a glass transition temperature $T_g$ in the range of −50° C. to 80° C., as determined by means of DSC, and all or part of the reactive raw materials are produced from renewable materials, such that the amorphous polyester includes a proportion of renewable raw materials of 90 to 100 wt. %, based on the total weight of the amorphous polyester.

2. The amorphous polyester according to claim 1, characterized in that a proportion of betulin structural units in the amorphous polyester is 6 to 65 mol %.

3. The amorphous polyester according to claim 1, characterized in that the (a) betulin is produced from renewable raw materials; and at least one of the (b) dicarboxylic acid and the (c) at least one compound, is produced from renewable raw materials.

4. The amorphous polyester according to claim 1, characterized in that the (b) dicarboxylic acid is selected from the group consisting of aliphatic dicarboxylic acids with 4 to 24 carbon atoms, aromatic dicarboxylic acids and dimer acids.

5. The amorphous polyester according to claim 4, characterized in that the dimer acid is a dimer of a fatty acid and/or derivatives thereof of the general formula $C_nH_{2n+1}COOH$, where n is a whole number from 7 to 33.

6. The amorphous polyester according to claim 1, characterized in that the short-chain polyol contains 2 to 8 carbon atoms.

7. The amorphous polyester according to claim 1, characterized in that the vegetable oil is selected from the group consisting of soybean oil, linseed oil, sunflower oil, rapeseed oil, thistle oil, fish oil, castor oil, tall oil, coconut oil, palm oil, olive oil and mixtures thereof.

8. A composition comprising the amorphous polyester according to claim 1.

9. A method for producing the amorphous polyester according to claim 1, comprising the following steps:
    providing a reactive raw material mixture of: the (a) betulin, the (b) dicarboxylic acid, and the (c) at least one compound selected from the group consisting of short-chain polyol, amine, and vegetable oil; and
    heating the mixture to a temperature of 200 to 250° C. to form the amorphous polyester.

10. The method according to claim 9, characterized in that the (a) betulin is soluble in the mixture.

11. The method according to claim 9, characterized in that the mixture further contains a catalyst, in an amount of 0.01 to 0.05 wt. %, based on the total weight of the mixture.

12. A method for producing a polymeric material, comprising the following steps:
    providing the amorphous polyester according to claim 1, characterized in that the amorphous polyester has terminal hydroxyl groups; and
    chemically modifying the terminal hydroxyl groups of the amorphous polyester by addition with organic compounds containing at least one epoxide and/or isocyanate group.

13. A polymeric material prepared by the method according to claim 12.

14. A composition comprising the polymeric material of claim 13.

15. The composition of claim 14, which is an adhesive or a sealant.

16. The composition of claim 14, which is a deformation or extrusion aid.

* * * * *

UNITED STATES PATENT AND TRADEMARK OFFICE
CERTIFICATE OF CORRECTION

| | | |
|---|---|---|
| PATENT NO. | : 12,006,396 B2 | Page 1 of 1 |
| APPLICATION NO. | : 16/906613 | |
| DATED | : June 11, 2024 | |
| INVENTOR(S) | : Adrian Brandt et al. | |

It is certified that error appears in the above-identified patent and that said Letters Patent is hereby corrected as shown below:

In the Specification

Column 5, Line 45 change "Jeffamine" to --Jeffamine®--.

Signed and Sealed this
Fourth Day of February, 2025

Coke Morgan Stewart
*Acting Director of the United States Patent and Trademark Office*